United States Patent Office 2,748,054
Patented May 29, 1956

2,748,054

STABLE VITAMIN B<sub>12</sub> AND SOLUBLE FOLIC ACID SALT MIXTURE

Alfred E. Jurist, Brooklyn, N. Y., assignor to Olin Mathieson Chemical Corporation, New York, N. Y., a corporation of Virginia No Drawing. Application October 16, 1951,
Serial No. 251,637

9 Claims. (Cl. 167—81)

This invention relates to therapeutic compositions essentially comprising a cobalamine and a water-soluble salt of folic acid.

The cobalamines (e. g., cyanocobalamine, or vitamin $B_{12}$) have been found to be clinically efficacious in the treatment of pernicious anemia with or without neurologic complications, and also in the treatment of tropical and nontropical sprue, nutritional macrocytic anemia due to cobalamine deficiency, and certain cases of megaloblastic anemia of infancy. It has been found also that when folic acid (or a water-soluble salt thereof) is administered with a cobalamine, it apparently greatly enhances utilization of the cobalamine. Moreover, clinical studies have indicated that deficiencies of both enter into the etiology of macrocytic anemia. It was obviously desirable, therefore, that a cobalamine and a water-soluble salt of folic acid be provided in a single therapeutic composition suitable or preparable for parenteral administration.

Although crystalline cyanocobalamine, either alone or dissolved in isotonic saline, is stable on extended storage or on heating for sterilization, it is relatively unstable under these conditions in the presence of a water-soluble salt of folic acid, such instability increasing with increasing content of the latter.

It is the object of this invention to provide therapeutic cobalamine-folic acid salt compositions of enhanced stability suitable or preparable for administration parenterally, and method of obtaining such stabilized compositions.

The therapeutic compositions of this invention essentially comprise the following components: (I) a cobalamine; (II) a water-soluble salt of folic acid; and (III) a pharmacologically-acceptable amino acid in a water-soluble state, the amino acid having a carboxy group acyclically-connected to a free amino group.

[The expression "in a water-soluble state" means, of course, that the amino acid may be in the form of its water-soluble salt (the salt-forming group being pharmacologically acceptable). In other words, the amino acid may be used as such if sufficiently water-soluble, but if not (and also in those cases where it is desirable for other reasons) the amino-acid is suitable salified. By "acyclically-connected" is meant, of course, that the amino and carboxy groups are joined together by a single carbon atom or an open chain of carbon atoms.]

These compositions may be provided in substantially-dry form, preferably in such form as to readily be dissolvable in water, e. g., lyophilized (freeze-dried). They may also be provided in the form of a solution of the components in a parenterally-administrable aqueous vehicle.

As component I there may be employed, inter alia, cyanocobalamine (vitamin $B_{12}$), hydroxocobalamine (vitamin $B_{12a}$), mixtures of cobalamines, and therapeutically utilizable concentrates of one or more cobalamines.

As component II there may be employed, various water-soluble salts of folic acid in which the salt-forming group is pharmacologically acceptable, notably sodium folate.

The proportions and concentrations of components I and II in the compositions of this invention may vary over wide limits, being determined only by the usual considerations, such as solubility and dosage. Thus, without setting out the operative limits but merely as illustrating the wide variation of concentrations utilizable in the parenteral solution compositions of this invention, the concentration of cyanocobalamine may be 15 micrograms or 100 micrograms/ml., and the concentration of folic acid (as sodium folate, for example) may be 1 or 25 mg./ml. In other words, these components are included in therapeutically significant proportions and concentrations; and the invention is especially applicable where the folic acid salt is present in such proportion and concentration as to make the cobalamine seriously unstable.

As component III there may be employed one or more of the following, inter alia: amino-acetic acid, alpha-alanine, beta-alanine, N-($\beta$-hydroxyethyl)-$\beta$-alanine, l-valine, l-tyrosine, tryptophane, l-leucine, alpha-aminobutyric acid, alpha-amino-isobutyric acid, mono-sodium glutamate, the sodium salt of beta-phenyl-alanine and sodium aspartate. Those amino acids in which the amino group is in alpha-position with respect to the carboxylic acid group (notably amino-acetic acid) are preferred.

The proportion and concentration of component III may vary over wide limits, the minimal being of course that which will effect the desired enhancement of stability, and the maximum being determined by solubility, economic and other obvious considerations. Thus, without setting out the operative limits but merely as illustrating the wide variation of concentrations utilizable in the parenteral solution compositions of this invention, the concentration of amino-acetic acid (for example) may be 2 or 50 mg./ml.—concentrations of the latter order being preferred when the compositions contain higher concentrations of folic acid, e. g., 25 mg. folic acid/ml. (as folic acid salt).

The compositions of this invention may of course contain other compatible components, either inert or active physiologically; e. g., other B vitamins (such as riboflavin and/or niacinamide), thymidine, and liver extract U. S. P.

The substantially-dry compositions of this invention may be obtained by merely mixing together (blending) the appropriate proportions of (substantially-dry, particulate) components I, II and III (and other components if desired), and subdividing by weight into suitable containers. The substantially-dry compositions are preferably prepared so as to be readily dissolvable in water, by dissolving components I, II and III (and other components if desired) in an aqueous vehicle, volumetrically subdividing the solution into suitable containers, and lyophilizing the solution in the containers. The parenteral solution compositions of this invention may be obtained by dissolving the desired components in a parenterally-administrable aqueous vehicle in any order, and volumetrically subdividing the solution into suitable containers.

The compositions of this invention (solution or substantially-dry solid for preparing a solution) must of course be sterile. Sterile substantially-dry compositions may be obtained, for example, by combining sterile components and subdividing into sterile containers, under sterile conditions; and sterile solution compositions may be obtained by filtering the solution through a bacteria-removing filter (e. g., a Berkefeld filter), or by heating the solution in sealed containers. To prevent any bacterial growth in the solution compositions before they have been sterilized, and (in the case of solutions prepared for lyophilizing) before the solutions have been lyophilized, a preservative (e. g., phenol) may be included in the usual concentration. Also, a preservative may be included in the parenterally-administrable aqueous vehicle used to reconstitute the dry compositions of this invention.

The compositions of this invention do not undergo significant losses of vitamin $B_{12}$ potency on heating for purposes of sterilization, and are stable for sufficiently extended periods, especially under moderate temperatures or refrigeration, to make them commercially-distributable products.

The following examples are illustrative of the invention (sterile components and conditions being employed wherever necessary or desirable):

Example 1

225 mg. sodium folate, 0.45 g. amino-acetic acid, 1.13 g. phenol, and 3,375 micrograms crystalline cyanocobalamine are dissolved in sufficient water to yield 225 ml. solution. The solution is filtered clear, volumetrically subdivided into ampules, and the ampules sealed and sterilized by heating for 20 minutes under 15 lbs. steam pressure.

Example 2

150 mg. sodium folate, 0.25 g. phenol, and 750 micrograms cyanocobalamine are dissolved in sufficient water to yield 50 ml. solution. 0.3 g. glutamic acid is then suspended in the solution and dissolved by addition of sufficient sodium bicarbonate to produce the sodium salt of the glutamic acid (the solution then having a pH of about 6.5); and the solution is filtered, ampuled and sterilized in the manner described in Example 1.

An equal weight of beta-alanine or leucine may be employed in place of the glutamic acid, the step of adding sodium bicarbonate to dissolve the amino acid being then unnecessary.

Example 3

1.125 g. sodium folate, 2.25 g. amino-acetic acid, 1.13 g. phenol, and 6.525 mg. cyanocobalamine are dissolved in sufficient water to yield 225 ml. solution, and the solution is sterile-filtered and lyophilized, either in bulk or after volumetrically subdividing into ampules or vials, the ampules or vials then being sealed. On addition of a sterile, parenteral aqueous vehicle, the product readily dissolves to provide a parenteral solution.

Example 4

250 mg. beta-phenyl-alanine,

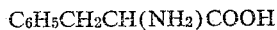

is dissolved in 10 ml. water with the aid of 128 mg. sodium bicarbonate; and to this solution is added 250 mg. phenol, 305 mg. sodium folate, 1500 micrograms cyanocobalamine, and sufficient water to make a final volume of 50 ml. The solution is then subdivided into ampules, and the latter sealed and sterilized by heating for 20 minutes at 15 lbs. steam pressure. The vitamin $B_{12}$ loss during heating is negligible.

Example 5

5.0 g. phenol is dissolved in 665 ml. distilled water, and 23.0 g. folic acid is added. The mixture is heated to 50–60° C., and sodium bicarbonate is added in small portions, while stirring, until the folic acid is completely dissolved, (about 9.0 g. sodium bicarbonate in all being required, and pH of the solution being about 7.5–8.0). Then 23.0 g. amino-acetic acid and 84.0 mg. crystalline cyanocobalamine are added, and the volume of the solution brought up to 1 liter with distilled water. The solution is then sterile-filtered (e. g., through a Hormann filter), filled into sterile vials under sterile conditions, then lyophilized in vials under aseptic conditions, and the vials sealed. The volume of solution filled and lyophilized is about one-fourth of the intended final volume of reconstituted solution prepared for parenteral administration. A suitable diluent for reconstituting the lyophilized material is a sterile 0.5% aqueous phenol solution.

A composition obtained substantially as described in Example 2, having the same sodium glutamate and sodium folate concentrations but an original cyanocobalamine concentration of 13.0 micrograms/ml., lost substantially no vitamin $B_{12}$ activity on heating for sterilization; whereas a composition with no sodium glutamate, the same sodium folate concentration, and an original cyanocobalamine concentration of 14.9 micrograms/ml. lost over 14% of its vitamin $B_{12}$ potency on heating for sterilization. (Other cyanocobalamine-folic acid compositons prepared for parenteral administration lost as much as 84% of their vitamin $B_{12}$ activity on heating for sterilization.)

A lyophilized composition obtained substantially as described in Example 3 lost substantially none of its vitamin $B_{12}$ potency on storage in a refrigerator for 14 months, as compared with a loss of about 29.4% with a similar composition but not containing the amino-acetic acid.

The invention may be variously otherwise embodied within the scope of the appended claims.

I claim:

1. A lyophilized composition adapted, on reconstitution, to provide a parenterally-administrable therapeutic preparation, essentially comprising the following components: a vitamin $B_{12}$; a pharmacologically-acceptable water-soluble salt of folic acid; and a pharmacologically-acceptable amino acid in a water-soluble state selected from the group consisting of amino-acetic acid, alpha-alanine, beta-alanine, N-($\beta$-hydroxyethyl)-$\beta$-alanine, 1-valine, 1-tyrosine, tryptophane, 1-leucine, alpha-amino-butyric acid, alpha-amino-isobutyric acid, mono-sodium glutamate, the sodium salt of beta-phenyl-alanine, and sodium aspartate, the ratio of amino acid component to folic acid salt component being of the order of .08 to 2.

2. A composition as defined by claim 1, in which the folic acid salt component is sodium folate.

3. A composition as defined by claim 1, in which the amino acid component is amino-acetic acid.

4. A composition as defined by claim 1, in which the amino acid component is sodium glutamate.

5. A composition as defined by claim 1, in which the amino acid component is leucine.

6. A composition as defined by claim 1, in which the amino acid component is $\beta$-phenyl-alanine.

7. A parenterally-administrable therapeutic preparation essentially comprising the following components dissolved in an aqueous vehicle: a vitamin $B_{12}$; a pharmacologically-acceptable water-soluble salt of folic acid; and a pharmacologically-acceptable amino acid in a water-soluble state selected from the group consisting of amino-acetic acid, alpha-alanine, beta-alanine, N-($\beta$-hydroxyethyl)-$\beta$-alanine, 1-valine, 1-tyrosine, tryptophane, 1-leucine, alpha-amino-butyric acid, alpha-amino-isobutyric acid, mono-sodium glutamate, the sodium salt of beta-phenyl-alanine, and sodium aspartate, the ratio of amino acid component to folic acid salt component being of the order of .08 to 2.

8. A lyophilized composition adapted, on reconstitution, to provide a parenterally-administrable therapeutic composition, composed of the following components: (I) a vitamin $B_{12}$; (II) a pharmacologically-acceptable water-soluble salt of folic acid; (III) a pharmacologically-acceptable amino acid in a water-soluble state selected from the group consisting of amino-acetic acid, $\alpha$-alanine, $\beta$-alanine, N-($\beta$-hydroxyethyl)-$\beta$-alanine, 1-valine, 1-tyrosine, tryptophane, 1-leucine, alpha-amino-butyric acid, alpha-amino-isobutyric acid, mono-sodium glutamate, the sodium salt of beta-phenyl-alanine and sodium aspartate; and (IV) a pharmacologically-acceptable preservative.

9. A parenterally-administrable therapeutic preparation composed of the following components dissolved in an aqueous vehicle: (I) a vitamin $B_{12}$; (II) a pharmacologically-acceptable water-soluble salt of folic acid; (III) a pharmacologically-acceptable amino acid in a water-soluble state selected from the group consisting of aminoacetic acid, α-alanine, β-alanine, N-(β-hydroxyethyl)-β-alanine, 1-valine, 1-tyrosine, tryptophane, 1-leucine, alpha-amino-butyric acid, alpha-amino-isobutyric acid, monosodium glutamate, the sodium salt of beta-phenyl alanine and sodium aspartate; and (IV) a pharmacologically-acceptable preservative.

References Cited in the file of this patent

Caswell: Journal of Biological Chemistry, vol. 180 (1949), pages 125 to 131 (167–81 $B_{12}$).

American Journal of Pharmacy, April 1950, page 144.

Lang: Federation Proceedings, vol. 9, March 1950, pages 194 and 195.

Journal of the American Pharmaceutical Association, Practical Pharmacy Edition, vol. 12, March 1951, page 134.

Harley: Journal of Pharmacy and Pharmacology, vol. 2, October 1950, page 657.

Greene: Journal of Biological Chemistry, Feb. 25, 1949, pages 999 and 1000.

Arnstein: Proceedings of the Biochemical Society in Biochemical Journal, vol. 48, January 1951, pages ii and iii.